C. H. BROWN.
AUTOMATIC CRANKING DEVICE.
APPLICATION FILED JAN. 24, 1911.

1,061,595.

Patented May 13, 1913.
3 SHEETS—SHEET 1.

Witnesses

Inventor
C. H. Brown.

By ——, Attorneys.

C. H. BROWN.
AUTOMATIC CRANKING DEVICE.
APPLICATION FILED JAN. 24, 1911.

1,061,595.

Patented May 13, 1913.
3 SHEETS—SHEET 2.

Witnesses
W. N. Woodson
Juana M. Fallin

Inventor
C. H. Brown
By H. W. Wallace, Attorneys.

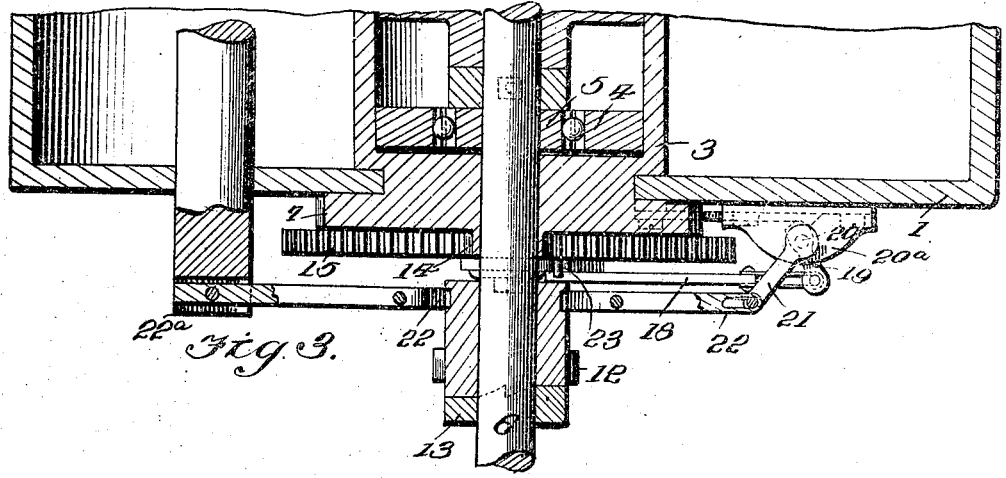
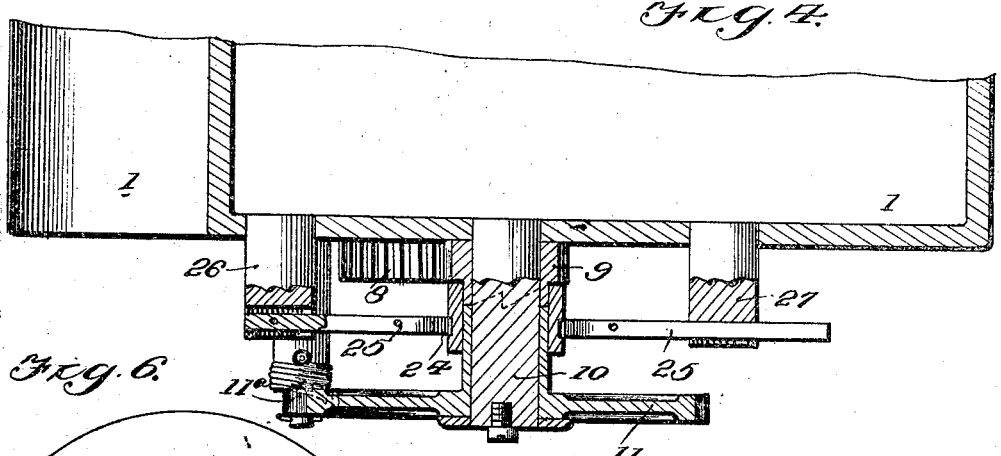
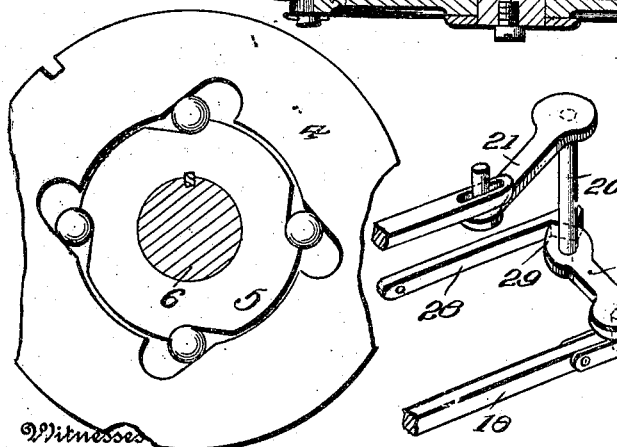

UNITED STATES PATENT OFFICE.

COLEMAN H. BROWN, OF PULASKI, TENNESSEE.

AUTOMATIC CRANKING DEVICE.

1,061,595.	Specification of Letters Patent.	Patented May 13, 1913.

Application filed January 24, 1911. Serial No. 604,455.

*To all whom it may concern:*

Be it known that I, COLEMAN H. BROWN, citizen of the United States, residing at Pulaski, in the county of Giles and State of Tennessee, have invented certain new and useful Improvements in Automatic Cranking Devices, of which the following is a specification.

This invention comprehends certain new and useful improvements in mechanical cranking devices for the internal combustion engines of automobiles, motor boats, or for stationary engines, and the invention has for its primary object a simple and efficient construction of device of this character which will be practically automatic in its operation, and enable the driver of an automobile, for instance, to start the motor without leaving the driver's seat.

The invention also has for its object an improved automatic engine starting device, operable by spring means and so arranged that the spring will be properly safeguarded by automatic means, the various elements or component parts of the device being so correlated with each other, that the spring winding means will be automatically thrown out of operation when the spring has been fully wound and the spring again automatically wound up to the proper tension after the spring has exerted its force in starting the engine shaft and become unwound. And the invention also aims to simplify, render more durable and otherwise generally improve this class of devices so as to make them more useful and commercially desirable.

With these and other objects in view as will more fully appear as the description proceeds, the invention consists in certain constructions, arrangements and combinations of the parts that I shall hereinafter fully describe and claim.

Figure 1:
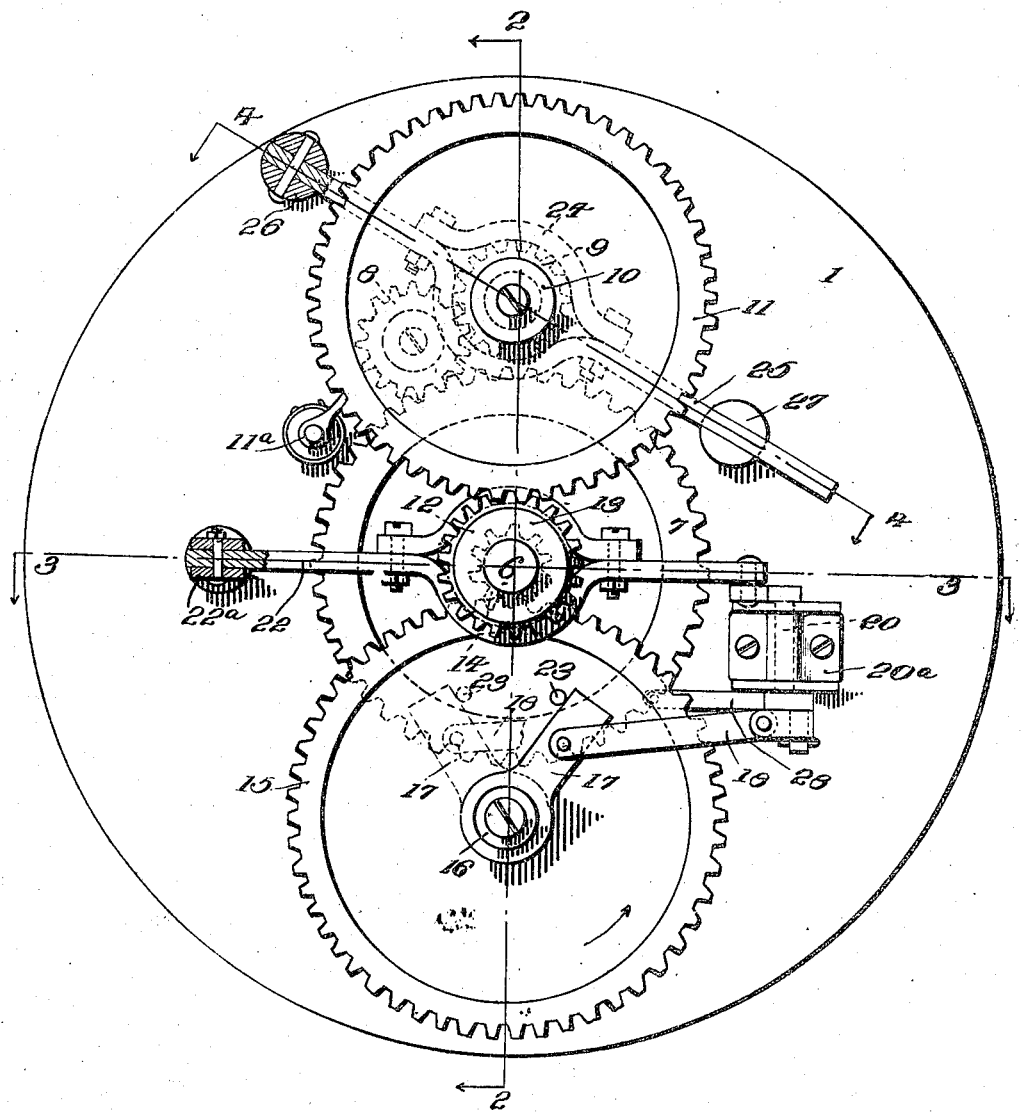
Figure 2:
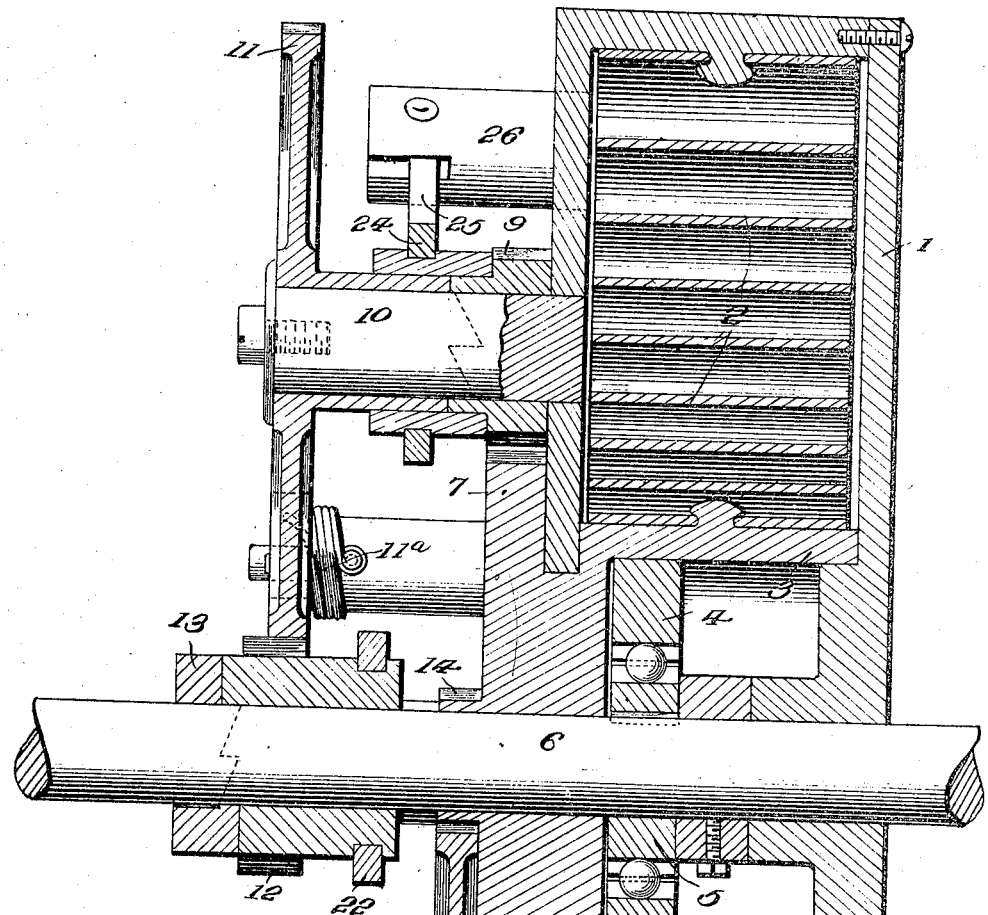

For a full understanding of the invention, reference is to be had to the following description and accompanying drawings, in which:

Figure 1 is a face view of my improved automatic cranking device; Fig. 2 is a transverse sectional view thereof, partly broken away, the section being taken approximately on the line 2—2 of Fig. 1; Fig. 3 is a section on the line 3—3 of Fig. 1; Fig. 4 is a section on the line 4—4 of Fig. 1; Fig. 5 is a fragmentary perspective view of a clutch actuated mechanism hereinafter specifically described; and, Fig. 6 is a detail view illustrating the ball clutch connection between the spring arbor and the cranking shaft.

Corresponding and like parts are referred to in the following description and indicated in all the views of the drawings by the same reference characters.

My improved engine cranking or starting device embodies a casing 1 of any desired size, designed to be mounted upon an automobile, for instance, in front of the radiator or engine hood or bonnet, in place of the ordinary hand operated crank. A coil spring 2 is mounted within the casing 1, one end of said spring being secured to the casing and the other end to an arbor 3. One member 4 of a ball clutch is rigidly connected to the arbor 3 and is mounted within the same as best illustrated in Fig. 2, and the other member 5 of said ball clutch is keyed or otherwise secured to the cranking shaft 6, which it is to be understood is identical with or operatively connected to the drive or crank shaft of the internal combustion engine with which my improved starting device is combined.

A gear wheel 7 is formed with or rigidly secured to the arbor 3 outside of the casing 1, said wheel meshing with an idler pinion 8, and said pinion in turn meshing with a pinion 9 having bearing upon a stud 10 projected from one face of the casing. A gear wheel 11 is also journaled on the stud 10 and meshes with a relatively wide pinion 12 slidable on the front end of the cranking shaft 6 and designed to be coupled thereto through the instrumentality of a relatively stationary clutch member 13 with which the pinion 12 is designed to engage. The pinion 12 is at all times in mesh with the gear wheel 11, owing to the width of the teeth of said pinion. The arbor 3 is also formed with, or has secured thereto, a relatively small spur pinion 14 which meshes with a gear wheel 15 mounted on a stud 16 projecting from the adjoining wall or face of the casing 1. A crank 17 is loosely mounted upon the stud 16 on the outer face of the wheel 15, said crank being connected by a pitman 18 to the crank 19 that is formed on one end of a shaft 20, said shaft being preferably substantially vertically disposed and journaled to rotate about its longitudinal axis in a bearing bracket 20ᵃ. The upper end of the shaft 20 is formed with a crank 21 disposed in angular relation to the crank 19 and connected to a laterally movable shipper lever 22 operatively connected intermediate of its ends to the pinion 12 to slide the same into and out of engagement with the clutch 13, said shipper lever being fulcrumed at one end in a stud or boss 22ᵃ formed on the adjoining face of the casing 1.

In order to actuate the loose crank 17, the gear wheel 15 is provided on its outer face with a stud or pin 23, designed to engage the opposite edges of the crank 17 to rock the same back and forth in the opposite rotations of the gear wheel 15, within the limits indicated by full and dotted lines in Fig. 1.

To connect and disconnect the pinion 9 and gear wheel 11, a clutch 24 is provided, and a shipper lever 25 which is operatively connected to said clutch, said shipper lever being fulcrumed at one end, as on a stud 26 formed on the adjoining face of the casing 1 and being guided in its movements in a forked stud 27, also formed on said face. The shipper lever 25 is operated by the driver of the automobile, for instance, in any desired way, as by a foot pedal, (not shown) arranged in convenient proximity to the driver's seat. The purpose of this shipper lever is to release the spring for cranking, as will be hereinafter more fully described. 28 designates a spring which is secured to one face of the casing 1 and which is designed to engage, alternately, the beveled ends 29 of the crank 19, so as to positively hold said crank and its concomitant parts in adjusted position, as against accidental movement.

11ᵃ designates a detent or pawl operating on the gear wheel 11 and designed to hold the same from running backward when the spring 2 is wound up, when the clutch 13 is released from the pinion 12.

In describing the practical operation of my improved engine cranking device, reference is to be first had to Fig. 1 which shows the clutches in position for winding, the pinion 12 being in mesh with the clutch 13 and the clutch 24 connecting together the gear wheel 11 and pinion 9. The turning of the shaft 6 will cause the pinion 12 to turn the gear wheel 11, and said gear wheel will also turn the pinion 9, and through the idler 8 will turn the gear wheel 7 which is integral with the spring arbor 3, causing the spring to be wound tightly, as is manifest. In this operation of winding, it will be evident that as the pinion 14 is integral with the arbor 3, it will turn the gear wheel 15 in the direction illustrated by the dart in Fig. 1. The pin 23 being against one edge of the crank 17, as illustrated in full lines in Fig. 1, will thus begin to move away from the crank until it comes around and engages the crank 17 on the opposite side, when it will move said crank to the position shown by dotted lines, and through the instrumentality of the pitman 18 and crank shaft 20, will move the shipper lever 22 in a direction to release the pinion 12 from the clutch 13. Thus the spring winding means will be automatically moved to an inoperative position after the spring has been wound to the desired tension, and the shaft 6 will run free, the gears being idle.

It is, of course, to be understood that the initial winding of the spring 2 is usually a manual operation, and that it may sometimes be necessary to rewind the spring, in case the automatic operation of cranking fails to start the engine, as from defective ignition, lack of fuel, or the like, but that ordinarily after the spring has been once wound, it will not be necessary to rewind it by hand, as it will be rewound by the positive rotation of the engine shaft. The shaft 6, therefore, which extends from the engine shaft or is identical therewith, also extends through the cranking device far enough to admit the use of a detachable crank at the front of the shaft in case it is necessary at any time to crank by hand or to rewind the spring. Preferably, there is a friction or other clutch forming the connection between the engine shaft and cranking shaft 6, so that this clutch can be thrown out while the engine is running, to eliminate the wear of the cranking shaft in the cranking device; and with this friction clutch thrown out, it is obvious that very little strength will be required to wind up the spring 2 and with perfect safety to the operator. Now, when the spring is under tension as hereinbefore described, and it is desired to automatically crank the engine, it is only necessary for the operator to move the shipper lever 25 in a direction to throw out the clutch 24, disconnecting the gear wheel 11 from the pinion 9. When this clutch is thrown out and said gear wheel and pinion released, the balls in the ball clutch 4, 5, will fall into the pockets, causing the arbor 3 and shaft 6 to rotate together, in an evident manner. As the spring thus revolves the shaft 6 by means of the ball clutch, the spring, of course, will tend to run down, and when this happens, the reverse rotation of the gear wheel 15 caused by its engagement with the pinion 14 of the arbor 3, will cause the pin 23 to come back into position so as to move the crank 17 from the dotted line to full line position, throwing the shipper lever 22 in a direction to effect the engagement of the pinion 12 and clutch 13, the spring thereupon beginning to wind up again under the actuation of the rotating shaft 6. These operations are, of course, repeated alternately, the spring being wound up by the shaft 6 and the spring winding means being moved to an inoperative position as soon as the spring has been fully wound up, and the spring winding means being subsequently automatically reset to an operative position after the spring has positively turned the crank shaft 16 and cranked the engine.

While the foregoing description and accompanying drawings disclose what I deem to be the preferred embodiment of my invention, it is to be understood that the invention is not limited thereto, but that various changes may be made in the construction, arrangement and proportions of the parts without departing from the scope of the invention as defined in the appended claims.

Having thus described the invention, what is claimed as new is:

1. A cranking device for engines, embodying a cranking shaft, a spring concentrically disposed to and mounted on the shaft, a train of gearing arranged to place the spring under tension upon the rotation of the shaft, said train of gearing including a clutch member mounted on the shaft, another clutch member on the shaft and co-acting with the said first-named clutch member, one of said clutch members being loose on the cranking shaft, and the other relatively fixed thereon, a shipper lever connected to one of said clutch members to connect and disconnect them, a wheel movable with the train of gearing, means controlled by said wheel for actuating said shipper lever, and means for transmitting energy from the spring under tension to the cranking shaft.

2. A cranking device for engines, embodying a power spring, a cranking shaft, a train of gearing arranged to place the spring under tension upon the rotation of the shaft, said train of gearing including a clutch member loose on the shaft, a clutch member relatively fixed on the shaft and co-acting with the loose clutch member, a shipper lever operatively connected to the loose clutch member, a revoluble stud movable with the train of gearing, a loose crank, the stud being arranged to engage said crank to move the same in one direction or the reverse according to the direction of revolution of the stud, a crank shaft operatively connected to said crank and to the shipper lever, and means for transmitting energy from the spring under tension to the cranking shaft.

3. A cranking device for engines, embodying a power spring, a cranking shaft, a train of gearing arranged to place the spring under tension upon the rotation of the shaft, a clutch member loose on the shaft and included in said train of gearing, another clutch member relatively fixed on the shaft and co-acting with the first-named clutch member, means for connecting and disconnecting said clutch members, said means including a loose crank, a shipper lever and an operative connection between the loose crank and the shipper lever, means for automatically moving said crank in opposite directions to operate the shipper lever in both directions so as to connect and disconnect the clutch members, and means for transmitting energy from the spring under tension to the cranking shaft.

4. A cranking device for engines, embodying a power spring, a cranking shaft, a train of gearing between the shaft and spring arranged to place the spring under tension upon the rotation of the shaft, said train of gearing including a clutch member, another clutch member, one of said clutch members being loose on the shaft and the other relatively fixed thereon, a wheel movable with the train of gearing and provided with a stud, a loose crank designed for engagement by said stud to move the crank in one direction or the reverse according to the direction of rotation of said wheel, a shipper lever arranged to connect and disconnect the clutch members, and an operative connection between said wheel and said shipper lever.

5. A cranking device for engines, embodying a cranking shaft, an arbor loosely mounted on the shaft, a spring held at one end and operatively engaging the arbor, a train of gearing arranged to place the spring under tension upon the rotation of the shaft, said train of gearing including a clutch member loose on the shaft, a clutch member relatively fixed on the shaft and co-acting with the loose clutch member, a shipper lever operatively connected to the loose clutch member to connect it and disconnect it with and from the fixed clutch member, a wheel actuated by the rotation of the arbor in one direction, means controlled by said wheel for actuating said shipper lever, and means for transmitting energy from the spring under tension to the crank shaft.

6. A cranking device for engines, embodying a cranking shaft, a power spring surrounding the shaft, a train of gearing arranged to place the spring under tension upon the rotation of the shaft in one direction, said train of gearing including a clutch member provided with a pinion and mounted loose on the shaft, a clutch member relatively fixed on the shaft and co-acting with the loose clutch member, a shipper lever connected to the loose clutch member, a wheel movable with the train of gearing, means controlled by said wheel for automatically actuating said shipper lever in a direction to disconnect the clutch members when the spring is placed under tension and in a direction to connect the clutch members when the spring is released, and means for transmitting energy from the tensioned spring to the cranking shaft.

7. A cranking device for engines, embodying a power spring, a cranking shaft, an arbor connected to said spring, a clutch mounted on the shaft, a pinion movable on said shaft and adapted for engagement with and disengagement from said clutch, gearing operatively connecting said pinion with the arbor to wind up the spring, a gear wheel operatively connected to said arbor to be turned thereby, a shipper lever arranged to make and break the connection between the pinion and clutch, a crank shaft having one crank connected to the shipper lever, a loose crank arm, a support therefor, a pitman connection between said loose crank and another crank formed on said crank shaft, said gear wheel being provided with a pin adapted to engage said loose crank arm to rock the same in opposite directions, whereby to actuate the shipper lever in both directions, for the purpose specified, means for holding the spring under tension, means for releasing the holding means, and means for transmitting the energy of the tensioned spring to the cranking shaft.

8. A cranking device for engines including a crank shaft, an arbor thereon engaging with the shaft for movement in one direction but disengaging therefrom upon a movement in the other direction, a power spring on the arbor, arbor driving means operatively engageable with the crank shaft and rotating the arbor in one direction to wind up the spring, means actuated by a rotation of the arbor through a predetermined number of revolutions in a direction to unwind the spring, automatically shifting said driving means into engagement with the crank shaft to rotate the arbor and wind up the spring, means when actuated by the rotation of the arbor in a spring winding direction through a predetermined number of revolutions automatically disengaging the arbor driving means from the shaft.

9. A cranking device for engines including a crank shaft, an arbor thereon engaging with the shaft upon a movement in one direction but disengaging therefrom upon movement in the other direction, a casing mounted upon the arbor, a coiled spring disposed within the casing and surrounding the arbor and attached at one end to the arbor and at the other end to the casing, arbor driving means mounted upon the casing and operatively engageable with the crank shaft, said driving means rotating the arbor in one direction to wind up the spring, means actuated by a rotation of the arbor through a predetermined number of revolutions in a direction to unwind the spring, automatically shifting said driving means into engagement with the crank shaft to rotate the arbor and wind up the spring, said means when actuated by the rotation of the arbor in a spring winding direction through a predetermined number of revolutions automatically disengaging the driving means from the shaft.

10. A cranking device for engines including a crank shaft, an arbor thereon engaging with the shaft upon a movement in one direction but disengaging therefrom upon movement in the other direction, a casing mounted upon the arbor, a coiled power spring mounted within the casing and connected at one end to the arbor and at the other end to the casing, a driving gear wheel mounted upon the casing to rotate the same, a gear wheel loose on the crank shaft and engaging said first named gear wheel, said last named gear wheel forming one member of a clutch, a second clutch member fast on the shaft and coacting with the first named clutch member, means for shifting the clutch members into or out of engagement, means actuated by a rotation of the arbor through a predetermined number of revolutions in a direction to unwind the spring, automatically shifting said movable clutch member into or out of engagement with the fixed clutch member to operatively connect or disconnect the driving gear to or from the shaft, said means when actuated by the rotation of the arbor in a spring winding direction, automatically disengaging the clutches when the arbor has accomplished a predetermined number of revolutions to wind up the spring.

11. A cranking device for engines including a crank shaft, an arbor thereon for engaging with the shaft upon a movement in one direction but disengaging therefrom upon movement in the other direction, a casing mounted on the arbor, a power spring surrounding the arbor and connected at one end to the arbor and at the other end to the casing, a shaft carried by the casing, a driving gear wheel on the shaft, a clutch member loose upon the crank shaft and carrying a gear wheel engaging with the first named gear wheel, a fixed clutch member on the crank shaft coacting with the loose clutch member, a gear wheel on the arbor, and a wheel carried by the casing and engageable with said gear wheel on the arbor, a shipper lever connected to the movable clutch, and means carried by the last named wheel for engaging said shipper lever to shift the movable member of the clutch in one direction or the other upon a rotation of the last named wheel through a predetermined angular distance in one or the other direction.

In testimony whereof, I affix my signature in presence of two witnesses.

COLEMAN H. BROWN. [L. S.]

Witnesses:
  GEO. B. MCCALLUM,
  H. W. MCMILLION.